Patented Feb. 13, 1934

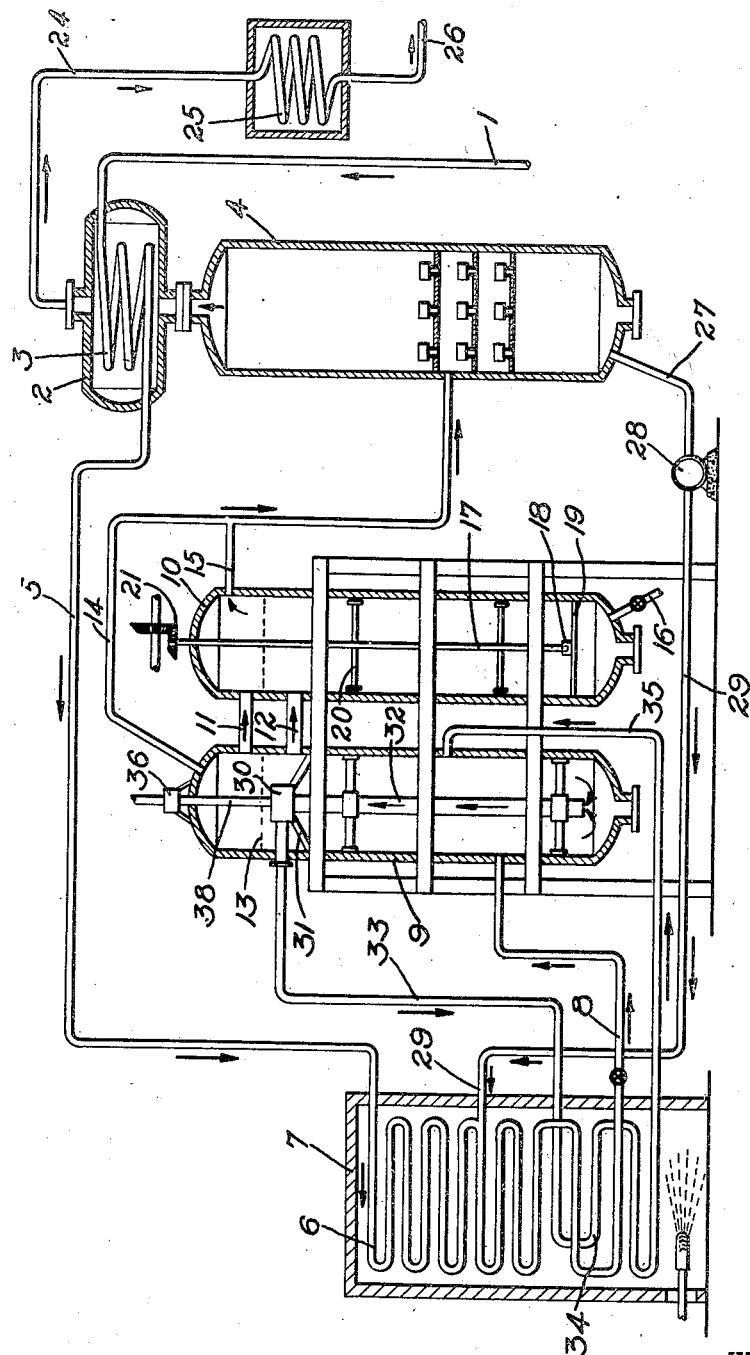

1,947,110

UNITED STATES PATENT OFFICE 1,947,110

APPARATUS FOR CRACKING HYDROCARBON OILS

Ross C. Powell, Forest Hills, N. Y., assignor to The Texas Company, New York, N. Y., a corporation of Delaware Application February 9, 1931. Serial No. 514,412

3 Claims. (Cl. 196—107)

This invention relates to a process of and apparatus for converting higher boiling hydrocarbon oils of the order of gas oil or even heavier into lower boiling ones of the order of gasoline. It relates more particularly to a process wherein a relatively heavy oil is heated to a desirable cracking temperature in a coil and is then discharged into a still or cracking vessel, where a body of the oil is maintained under substantially uniform cracking conditions, recycling a portion of the oil between the still and a reheating coil to make uniform the condition in the still from which a continuously forming vapor is withdrawn overhead and an overflowing liquid portion is collected in an adjoining vessel where the accumulated liquid is held for an appropriate interval of time to effect further conversion and vaporizing and also settling, and to apparatus for carrying out the process.

Among the more important objects of the invention, which has to do with the production of motor fuel or gasoline, is to raise the oil to a desirable temperature of conversion and to maintain a body of the oil at this temperature in substantial uniformity during a period of conversion or decomposition, agitating the body of oil to promote the separation of decomposed portions and to effect uniform distribution of heat and to thereafter subject the partially decomposed stock to decomposition and settling in a quiescent state where the forming tarry or cokey constituents are precipitated and withdrawn. Other uses and advantages of the invention will become apparent from the following description and the accompanying drawing which illustrates diagrammatically a preferred form of apparatus for carrying out the process of my invention.

In the drawing, fresh oil from a supply not shown may be pumped thru a line 1 into a heat exchanger 2 which has arranged therein a coil 3 thru which the relatively cold oil is passed in heat exchange relation with hot vapors entering the exchanger 2 from a fractionating or dephlegmating tower 4. From the exchanger 2 the oil is directed thru a preferably insulated line 5 to a heating coil 6 arranged within a furnace 7. The oil is heated in the coil 6 to a desired cracking temperature or slightly in excess thereof and conducted thru a preferably insulated line 8 to a still or cracking vessel 9 which is preferably insulated to minimize heat loss by radiation.

The still 9 is inter-connected with a second still 10, which is also preferably insulated, by means of insulated lines 11 and 12 which serve to equalize the pressure and liquid level in stills 9 and 10, in which the oil level normally rests at the point 13. As conversion of the oil in stills 9 and 10 progresses vapor is continuously withdrawn thru preferably insulated lines 14 and 15 connected at points near the tops of the stills 9 and 10 and delivered into the fractionating or dephlegmating tower 4.

Cokey substance formed or precipitated during the cracking reaction is settled in the still 10 and may be withdrawn more or less continuously thru a line 16 located at a point near the bottom of the still. Such coke or carbon as deposits on the walls of the still 10 may be removed regularly by scraping means consisting of a shaft 17 vertically arranged within the still 10 and having a socket 18 supported upon a bracket 19 near the bottom of the still, scraper arms 20 and a driving mechanism 21.

Vapors entering the fractionating or dephlegmating tower 4 are subjected to fractionation. The lighter fractions, having desired characteristics, move on toward the top of the tower and finally emerge as a vapor and are passed overhead thru the exchanger 2 in heat exchange relation with cold charge moving thru the coil 3 as previously described.

The partially cooled vapors are conducted from the exchanger 2 thru a line 24 to a water condenser 25. From the condenser 25 the condensate is conveyed thru a line 26 to receiving apparatus not shown.

The heavier fractions resulting from partial condensation in the fractionating or dephlegmating tower 4 are trapped out thru a preferably insulated line 27 from a point near the bottom of the tower and are picked up by a pump 28 which returns this oil to the heating zone; delivering it to the coil 6 at the point 29.

A centrifugal or other suitable pump 30, enclosed within the still 9 and supported to the wall thereof by a bracket 31, serves to withdraw a portion of the oil from the still 9 continuously thru a suction line 32 from near the bottom of the still and discharges it into a line 33 connected at a point near the top of the still 9, thru which line the oil is conducted to a coil 34 arranged within the hottest part of the furnace 7. From the coil 34 the oil is returned by means of an insulated line 35 to a lower point in the still 9. A motor or turbine 36 located above the still 9 has an operating connection 38 adapted to drive the centrifugal pump 30.

In the cracking of oil, when oil is preheated before entering the cracking zone, a portion of the heat contained in the oil upon entering the cracking zone is spent in vaporization and an additional amount is lost by radiation, consequently unless some heat is added to the oil in the reaction zone a temperature drop will be experienced and the rate of cracking will be reduced. My invention contemplates supplying additional heat to oil in the cracking zone in sufficient amounts to compensate for the heat spent in vaporization and that lost by radiation or in some instances to raise the temperature, if such is desirable, slightly above that of the oil entering the first still.

It is desirable in this connection to avoid the application of external heat to the still or cracking vessel which is particularly hazardous and promotes deposition of coke or carbon upon the walls of the vessels. It is further desirable to maintain the heater outlet temperature only slightly above the temperature it is desired to maintain in the cracking zone so as to hold the production of carbon and uncondensable gas in the first pass to a minimum.

As set forth, my invention contemplates drawing a stream of oil from a point near the bottom of the vertical still 9 thru the suction line 32, which extends upwardly to a point near the top of the still, heating it in the separate coil 34 which is situated in the hottest part of the furnace 7, and returning it to the still 9. In carrying out these steps a somewhat cooler portion of oil may be withdrawn from near the bottom of the still, circulated thru the reheating coil, and returned to the lower portion of the still, preferably somewhat above the drawoff, to supply additional heat to the body of oil as necessary to maintain the desired temperature in the stills.

In maintaining the temperature of the body of oil in the first still at approximately that of the oil entering from the first or heating coil, by reheating a portion of oil in the manner just previously described and returning it to the first still, it is of course necessary to raise the temperature of the reheated oil somewhat above that of the temperature at which it is desirable to maintain the body of oil in the still. On the other hand it is desirable not to raise the temperature of this oil being reheated above a certain degree, that is above the point of undue coke formation. A preferred method of supplying a desirable amount of heat to the body of oil in the still and at the same time not heat the stream of oil too hot is to pass an increased volume of oil through the reheater section.

In addition to maintaining a temperature of the bodies of oil in the stills approximately uniform with the temperature of the oil entering from the heater coil to promote the reaction of the decomposable portions of those bodies, which is a primary object, there are other advantages to be realized in the reheating of this particular portion of oil, that is the portion which is drawn from near the bottom of the first reaction vessel in the system.

In the first place it is to be seen that the portion of oil drawn from the lower portion of the still, while more refractory than the original charge, contains a substantial amount of constituents which are decomposable under favorable conditions. For example, a fraction of the nature of that withdrawn from the lower portion of the first still will decompose when subjected to a somewhat higher temperature at the same pressure. Thus it follows that additional conversion of this fraction is accomplished in passing it thru the reheater coil and raising the temperature higher than the degree to which the initial charge is raised before delivering it into the first still.

Another advantage is to be realized in regulating the amount or volume of oil reheated. Depending on the nature of the charging stock and the oil in the first still optimum conditions may be determined whereby the oil to be reheated can be raised to a desirable temperature and also be passed thru the reheater coil at such velocity that the time it is held at this higher temperature will be relatively short. Under such conditions this portion of oil is held at a desirable elevated temperature for such a very short time that decomposition advances only far enough to produce desirable lighter constituents, that is it does not advance far enough in the coil to produce a substantial amount of free carbon or coke.

The oil is passed rapidly thru the reheater where the temperature is elevated and it is immediately delivered into the body of oil in the first still to which it gives up a portion of its heat. In this manner a regulatable degree of reaction of the reheated oil is brought about which produces additional lighter components and additional heavier components therefrom but as the time at the elevated temperature is so limited the theoretical secondary reaction which produces coke or free carbon does not occur to a substantial degree. The sweeping action of the rapidly circulating oil thru the reheater coil will also tend to minimize the formation or adherence of coke on the inner walls of the tubes, which tends to be promoted by the relatively high temperature of the walls of the tubes.

In addition to other advantages, there is also the advantage of maintaining a mildly agitated or turbulent body of liquid in the first still which will aid in releasing decomposed portions from the body of oil, will keep in suspension any finely divided carbon or cokey constituents that may be unintentionally formed and serve to effect an even distribution of heat throughout the body.

The still 10, into which an overflow of the hot liquid from the still 9 is directed, in addition to serving as a further reaction chamber also serves as a settling drum for the finely divided coke and the tarry substances. Generally speaking, except for heat loss, conditions of temperature and pressure are substantially the same in still 10 as in still 9.

Obviously many modifications and variations of the invention, as hereinbefore set forth, may be made without departing from the spirit and scope thereof, and therefore, only such limitations should be imposed as are indicated in the appended claims.

I claim:

1. In apparatus of the coil and drum type for cracking hydrocarbon oils, a heating coil, a cracking vessel having an inlet pipe from the heating coil, a conduit extending from a point near the bottom of the cracking vessel to a point near the top thereof, a pump having its suction end connected to the upper section of the conduit, a second heating coil separate from the first coil thru which the pump forces oil drawn in thru the conduit, a pipe connection for returning the reheated oil from the said coil to the vessel at a point substantially removed from the point of connection between said vessel and the said inlet pipe leading thereto from said first-named coil, means for taking off and condensing vapors from the vessel, a second cracking vessel, liquid overflow conduit means interconnecting the said vessels at points a substantial distance above the bottoms thereof, whereby oil overflows from the first vessel into said second vessel and is subjected to further cracking in the latter and means for discharging the forming tarry constituents from said second vessel.

2. In apparatus of the coil and drum type for cracking hydrocarbon oils, a heating coil, a cracking vessel having an inlet pipe from the heating coil, a conduit extending from a point near the bottom of the cracking vessel to a point near the top thereof, a pump having its suction end connected to the upper section of the conduit, a second heating coil separate from the first coil thru which the pump forces oil drawn in thru the conduit, a pipe connection for returning the reheated oil from the said coil to the vessel at a point substantially removed from the point of connection between said vessel and the said inlet pipe leading thereto from said first-named coil, a second cracking vessel, liquid overflow conduit means interconnecting the said vessels at points a substantial distance above the bottoms thereof, whereby oil overflows from the first vessel into the second vessel and is subjected to further cracking therein, means for withdrawing from the second vessel precipitating tarry constituents and means in vapor communication with both vessels for dephlegmating vapors which are formed in the said vessels.

3. In apparatus of the coil and drum type for cracking hydrocarbon oils, a heating coil, a cracking vessel having an inlet pipe from the heating coil, a conduit extending from a point near the bottom of the cracking vessel to a point near the top thereof, a pump having its suction end connected to the upper section of the conduit, a second heating coil separate from the first coil thru which the pump forces oil drawn in thru the conduit, a pipe connection for returning the reheated oil to the said vessel at a point intermediate the top and bottom of said vessel and substantially removed from the point of connection between said vessel and the said inlet pipe leading thereto from said first-named coil, a second cracking vessel, liquid overflow conduit means interconnecting the said vessels at points a substantial distance above the bottoms thereof, whereby oil overflows from the first vessel into the second vessel and is subjected to further cracking therein, means for withdrawing from the second vessel the precipitating tarry constituents, means in vapor communication with both vessels for dephlegmating vapors which are formed, means for condensing the dephlegmated vapors and means for returning the reflux condensate from the dephlegmator to the first coil.

ROSS C. POWELL.